(12) United States Patent
Guibert

(10) Patent No.: US 12,117,112 B2
(45) Date of Patent: Oct. 15, 2024

(54) COMPACT AND DEMOUNTABLE FLUID CONNECTION DEVICE

(71) Applicant: A. RAYMOND ET CIE, Grenoble (FR)

(72) Inventor: Kévin Guibert, Grenoble (FR)

(73) Assignee: A. RAYMOND ET CIE, Grenoble (FR)

( * ) Notice: Subject to any disclaimer, the term of this patent is extended or adjusted under 35 U.S.C. 154(b) by 282 days.

(21) Appl. No.: 17/627,588

(22) PCT Filed: Jul. 10, 2020

(86) PCT No.: PCT/FR2020/051254
§ 371 (c)(1),
(2) Date: Mar. 28, 2022

(87) PCT Pub. No.: WO2021/009455
PCT Pub. Date: Jan. 21, 2021

(65) Prior Publication Data
US 2022/0275895 A1    Sep. 1, 2022

(30) Foreign Application Priority Data
Jul. 15, 2019    (FR) ...................................... 1907932

(51) Int. Cl.
*F16L 37/098*    (2006.01)
*F16L 37/088*    (2006.01)
*F16L 37/091*    (2006.01)

(52) U.S. Cl.
CPC ....... *F16L 37/0987* (2013.01); *F16L 37/0887* (2019.08); *F16L 37/0915* (2016.05); *F16L 37/0982* (2013.01)

(58) Field of Classification Search
CPC ............... F16L 37/0987; F16L 37/0915; F16L 37/0982; F16L 37/0887
See application file for complete search history.

(56) References Cited

U.S. PATENT DOCUMENTS

| 4,647,082 A | 3/1987 | Fournier et al. |
| 4,834,423 A | 5/1989 | De Land |

(Continued)

FOREIGN PATENT DOCUMENTS

| EP | 1797542 B1 | 10/2005 | |
| GB | 2573165 A | * 10/2019 | .......... F16L 37/0915 |

(Continued)

OTHER PUBLICATIONS

International Search Report for International Application No. PCT/FR2020/051254 dated Nov. 20, 2022, 2 pages.

(Continued)

*Primary Examiner* — James M Hewitt, II
(74) *Attorney, Agent, or Firm* — TraskBritt

(57) ABSTRACT

A connection device for connecting a tubular connector to equipment comprises: —a connection end fitting formed by a tubular body and a head mounted thereon, the head being provided with an opening leading into the tubular body and comprising a retaining groove; —a flexible lock, which has an annular shape and is intended to be partially received in the retaining groove, the lock being provided with lugs extending radially toward the center of the lock, wherein the flexible lock is deformable and the lugs can close on the tubular connector and abut against the collar when the tubular connector is introduced into the connection end fitting; —an unlocking ring having a collar for insertion into the connection end fitting, the collar including unlocking elements for interacting with the flexible lock to force the opening thereof when the unlocking ring is rotated.

20 Claims, 4 Drawing Sheets

(56) References Cited

U.S. PATENT DOCUMENTS

| | | | |
|---|---|---|---|
| 4,915,421 A | | 4/1990 | Dennany |
| 5,356,183 A | | 10/1994 | Cole |
| 5,607,190 A | * | 3/1997 | Exandier ............. F16L 37/0985 |
| | | | 285/308 |
| 5,799,987 A | | 9/1998 | Sampson |
| 5,890,749 A | | 4/1999 | Fukaya et al. |
| 6,173,994 B1 | | 1/2001 | Ketcham |
| 6,340,180 B1 | * | 1/2002 | Wisniewski ........ F16L 37/0982 |
| | | | 285/319 |
| 7,118,138 B1 | | 10/2006 | Rowley et al. |
| 9,068,680 B1 | | 6/2015 | Crompton et al. |
| 2003/0168855 A1 | | 9/2003 | Kaminski et al. |
| 2003/0168856 A1 | | 9/2003 | Kaminski et al. |
| 2005/0173923 A1 | | 8/2005 | Ketcham et al. |
| 2011/0025042 A1 | * | 2/2011 | McNeil ............... F16L 37/0982 |
| | | | 285/39 |
| 2016/0025252 A1 | | 1/2016 | Tran et al. |

FOREIGN PATENT DOCUMENTS

| | | |
|---|---|---|
| JP | 2003-194278 | 7/2003 |
| JP | 2007-107580 A1 | 4/2007 |

OTHER PUBLICATIONS

International Written Opinion for International Application No. PCT/FR2020/051254 dated Nov. 20, 2022, 6 pages.

* cited by examiner

COMPACT AND DEMOUNTABLE FLUID CONNECTION DEVICE

CROSS-REFERENCE TO RELATED APPLICATIONS

This application is a national phase entry under 35 U.S.C. § 371 of International Patent Application PCT/FR2020/051254, filed Jul. 10, 2020, designating the United States of America and published as International Patent Publication WO 2021/009455 A1 on Jan. 21, 2021, which claims the benefit under Article 8 of the Patent Cooperation Treaty to French Patent Application Serial No. 1907932, filed Jul. 15, 2019.

TECHNICAL FIELD

The present disclosure relates to a compact and demountable fluid connection device placed between an equipment and a connector in order to easily connect a fluid circulation duct. This type of device is particularly useful in the automotive field, and more particularly in the braking field, and in this case the fluid may be compressed air.

BACKGROUND

In the state of the art there is a wide variety of connection devices between a tubular end fitting connector with an annular collar and an equipment having a through passage. These two elements are often connected through the use of an additional piece, which may be fastened on the equipment to retain the tubular connector.

Such devices are thus known from documents US20160025252, JP2007107580, US20050173923, JP2003194278, U.S. Pat. Nos. 6,173,994, 4,915,421, 4,834,423, 7,118,138, 5,890,749, 5,799,987, EP1797542, U.S. Pat. No. 5,356,183, US2003168856, U.S. Pat. Nos. 9,068,680, 4,647,082 and US2003168855. These devices often have the drawback of being bulky or not easily demountable or require the use of a special demounting tool.

BRIEF SUMMARY

An object of the present disclosure is to provide a compact and easily demountable connection device.

With a view to achieving this object, the subject matter of the present disclosure proposes a connection device for connecting a tubular connector defining a longitudinal direction provided with an annular collar to an equipment comprising a passage, the connection device comprising:
  a connection end fitting connecting to the passage of the equipment, the connection end fitting being formed of a tubular body and a head mounted thereon provided with an opening leading into the tubular body and comprising a retaining groove, the head comprising at least one notch opening onto the retaining groove;
  a flexible ring-shaped lock intended to be partially housed in the retaining groove, the lock being provided with lugs extending radially toward the center of the lock and at least one longitudinal indexing piece connected to the lug and intended to be housed in the notch of the groove, the flexible lock being deformable and the lugs being able to close on the tubular connector after the passage of the collar to abut against the collar when the tubular connector is introduced longitudinally into the connection end fitting;
  an unlocking ring provided with a collar intended to be inserted into the connection end fitting, the collar being provided with unlocking elements intended to interact with the indexing pieces of the flexible lock to force it to open when the unlocking ring is rotated.

According to other advantageous and non-limiting features of the present disclosure, taken alone or in any technically feasible combination:
  the passage is circular and provided with an inner thread, and the tubular body is provided with an outer thread to secure the connection end fitting to the equipment;
  the lugs have inclined planes to facilitate the deformation of the lock during the insertion of the tubular connector through the connection end fitting;
  the flexible lock has a "C" shape and comprises two free ends capable of approaching one another;
  the unlocking elements comprise ramps;
  the ramps are separated from each other by a stop;
  each ramp is a monotonous progression;
  each ramp is formed of two portions to present a flared "U" profile;
  each longitudinal indexing piece has a portion projecting toward the inside of the lock, so as to form a guide space between this projecting part and the lug, which it overhangs to receive the unlocking elements.

BRIEF DESCRIPTION OF THE DRAWINGS

Other features and advantages of the present disclosure will become apparent from the following detailed description of embodiments of the present disclosure with reference to the accompanying figures, in which.

DETAILED DESCRIPTION

For sake of simplicity, the same references are used for identical elements or for elements performing the same function.

Figure 1:
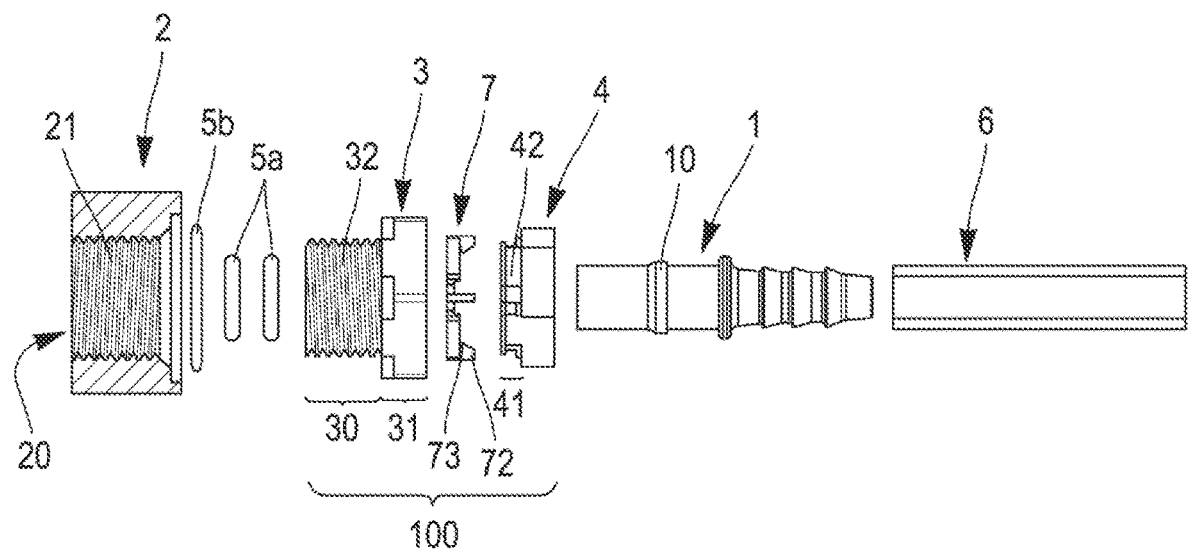
FIG. 1 shows, in exploded view, an assembly comprising a connection device according to the present disclosure.

FIG. 1 shows, in exploded view, an assembly comprising a connection device 100 according to the present disclosure.

The connection device 100 is intended to fluidly connect, in a demountable manner, a duct 6 to an equipment 2. For this purpose, the equipment 2 comprises a passage 20, which here is circular and provided with an inner thread 21. The fluid may be a liquid or a gas, such as compressed air.

The duct 6 is connected to a first end of a tubular connector 1, for example, by means of a mechanism of the "Christmas tree" type. The tubular connector 1 is provided with an annular collar 10 on the side of its second end intended to be inserted into the connection device 100. The tubular connector 1 defines a longitudinal direction in which it may be inserted into the connection device 100.

The equipment 2, the connection device 100, and/or the tubular connector 1 advantageously have seals 5a, 5b, making it possible to obtain a sealed connection between them. Thus, in the examples shown, two first seals 5a are provided, arranged in annular grooves of a connection end fitting 3. A second seal 5b has also been provided between the connection device 100 and the equipment 2, housed in a groove made for this purpose in the passage 20 of the equipment 2. It is also conceivable to provide other seals, instead of, or in addition to, those shown in the figures.

General Description of the Connection Device

Figure 2:
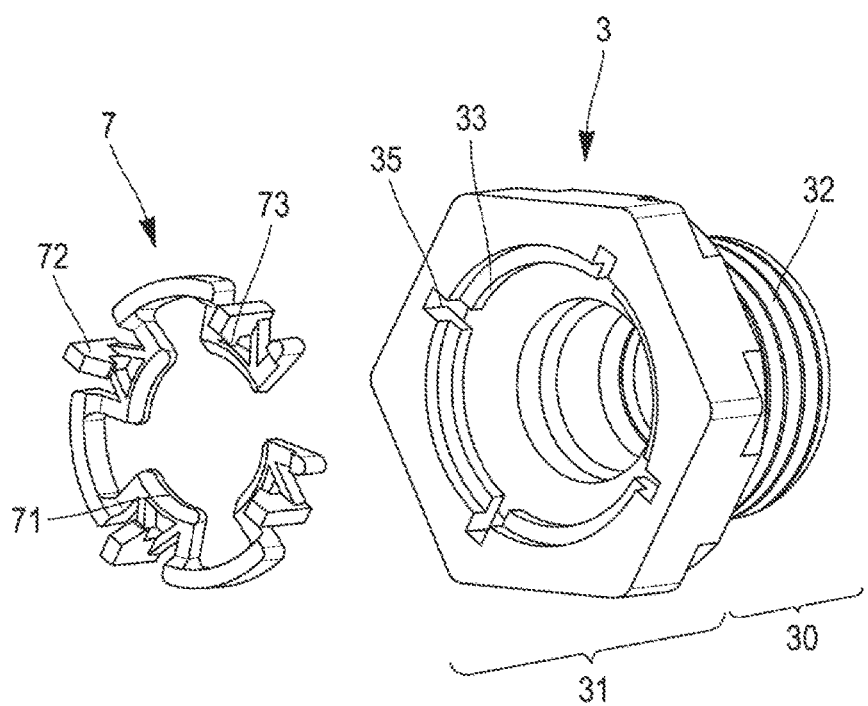
FIG. 2 shows, in exploded view, a connection end fitting and a lock according to the present disclosure.

FIG. 2 shows an exploded view of a connection end fitting 3 and of a lock 7 according to the present disclosure.

The connection end fitting 3 is formed of a tubular body 30 and a head 31 mounted thereon. The tubular body 30 of the connection end fitting 3 has a cross section, the inner diameter of which corresponds substantially to the outer diameter of the connector 1, in order to allow their connection. As is more visible in FIG. 4, the body 30 has an inner shoulder in order to create a stop for the collar 10 and thus limit the insertion of the connector 1 into the connection end fitting 3. The tubular body 30 comprises on its outer surface an outer thread 32 configured to cooperate with the inner thread 21 of the equipment 2 and thus make it possible to attach the connection end fitting 3 to the equipment. Any other form of attachment between these two elements is possible.

The head 31 is provided with an opening leading into the tubular body 30. When the connection end fitting 3 is suitably assembled, here by screwing, to the equipment 2, the head 31 abuts against a bearing surface of the equipment 2 and remains accessible from the outside to allow, for example, its disassembly. To this end, the head 31 of the connection end fitting 3 has a shape configured to be manipulated with a tool, which may be very conventional. The head 31 here has a hexagonal shape so that it may be grasped by a tool of the open-end wrench type.

The head 31 of the connection end fitting 3 comprises, on its inner surface, retaining means 33 for retaining the lock 7. The retaining means 33 are here formed of an annular groove 33 present over the entire periphery of the inner surface of the head 31 and in which part of the lock 7 may be housed. The diameter of the annular groove 33 is substantially greater than that of the general shape of the lock 7, which will be described in more detail in the remainder of the description.

Advantageously, the connection end fitting 3 is metallic in nature, for example, made of brass.

In general, the lock 7 is intended to retain the tubular connector 1 assembled to the connection end fitting 3 when the tubular connector 1 is introduced longitudinally into the connection device 100 to fluidly connect the duct 6 to the equipment 2.

The lock 7 is a flexible piece, which may be made of plastics, and has a generally annular shape to be housed and held in place, after deformation, in the annular groove 33.

In the example shown in FIG. 2, it has two ends, which face each other, and which are not integral with one another, which gives flexibility to the piece. This "C" shape facilitates its insertion into the annular groove 33.

Figure 6:
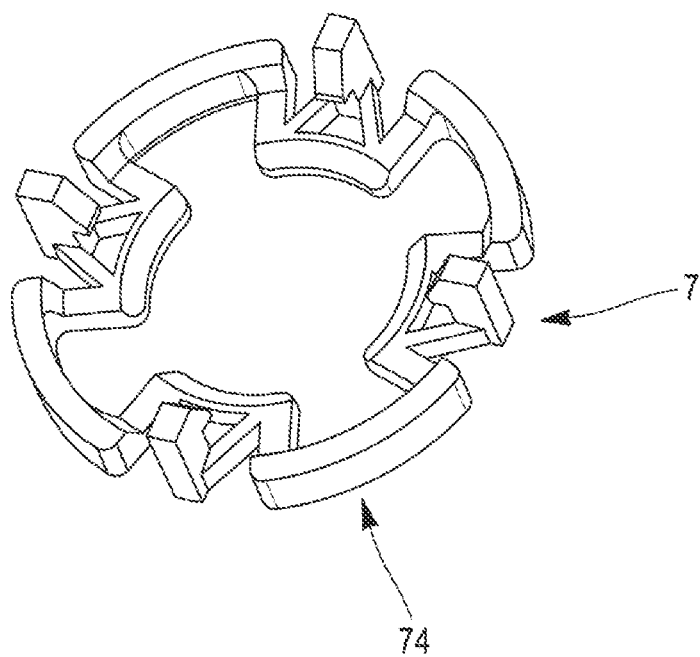
FIG. 6 shows an alternative configuration of a lock according to the present disclosure.

FIG. 6 shows an alternative configuration of a lock 7 according to the present disclosure. Like that shown in FIG. 3, the lock comprises straps 74. However, the lock 7 of FIG. 6 is perfectly annular and thus has an "O" shape. By compressing the lock 7 so as to bring the straps closer to each other, the diameter of the lock 7 is reduced, which allows it to be inserted into the annular groove 33 of the connection end fitting 3.

Figure 3:
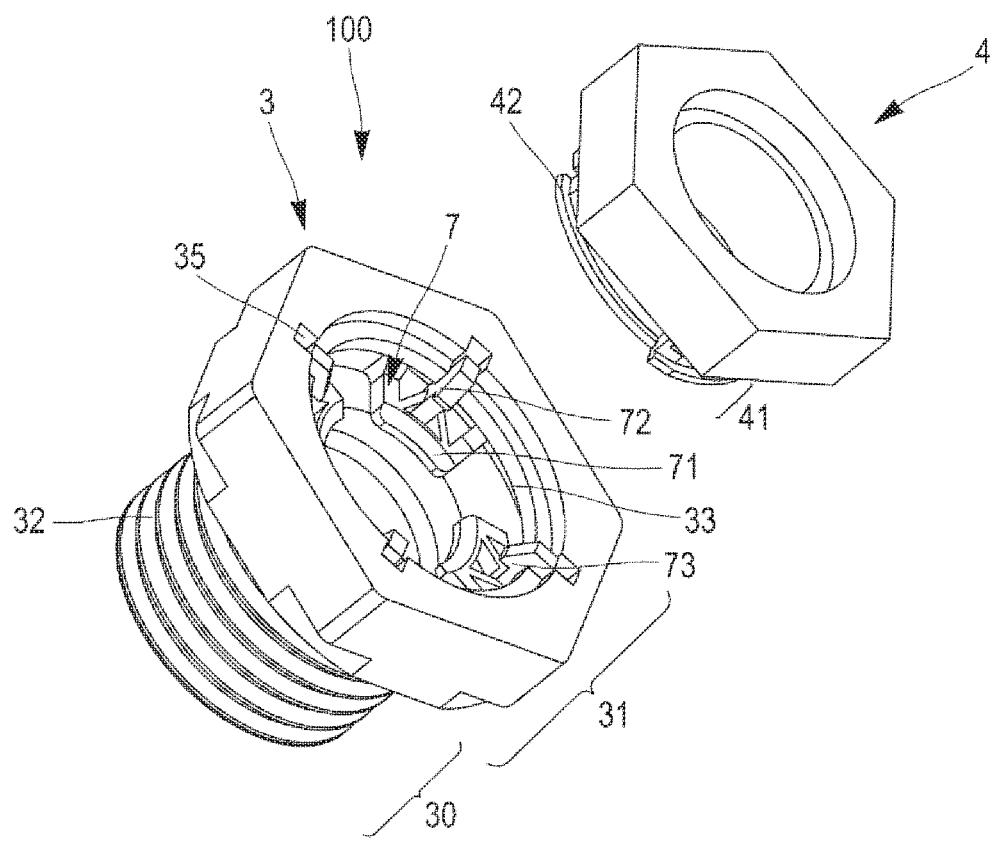
FIG. 3 shows, in exploded view, a lock assembled on a connection end fitting as well as an unlocking ring according to the present disclosure.
Figure 4:
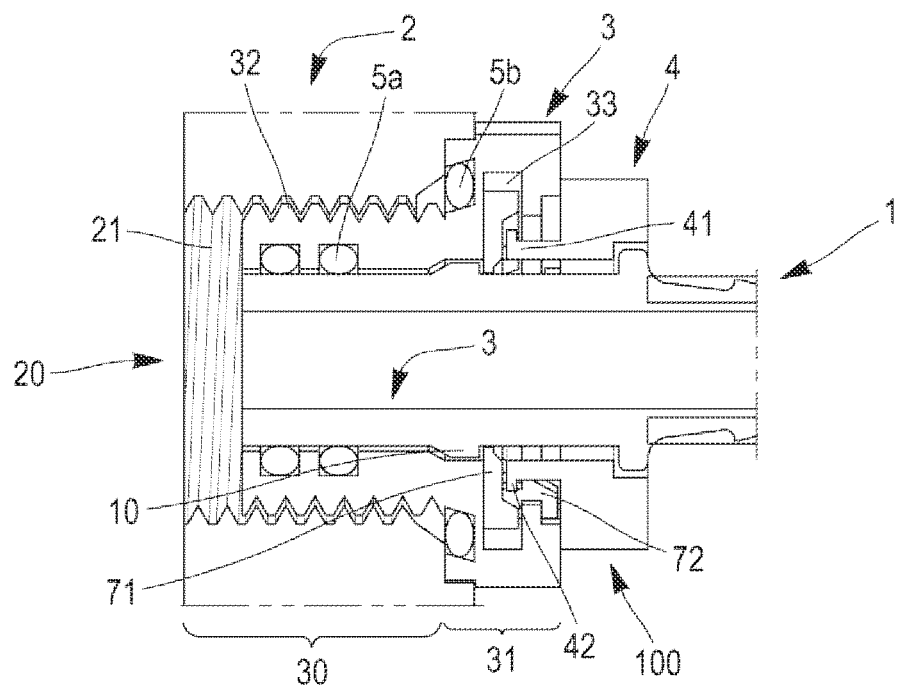
FIG. 4 shows a cross-sectional view of a connection device according to the present disclosure in the assembly configuration.

The lock 7 is provided with lugs 71, here four lugs 71 arranged in pairs facing each other on the lock of FIG. 3 and two lugs 71 in the case of the lock 7 of FIG. 6, extending radially toward the center of the lock 7 in a transverse plane, as may be seen, in particular, in FIGS. 2, 4, and 6. This configuration of the lugs 71 makes it possible to obtain a compact lock 7, by containing the lugs 71 in a transverse plane, and thus contributes to making the connection device 100 more compact.

As has already been stated, the annular groove 33 has a sufficient diameter to allow the lock 7, when the lock is actually engaged in the groove 33, to deform radially outwards. When the tubular connector 1 is inserted longitudinally into the connection device 100, the lugs 71 may thus move away from each other to allow the collar 10 to advance and close thereon. The collar 10 is thus placed between stops formed by the lugs 71 of the lock 7 and the inner shoulder of the connection end fitting 3. Advantageously, the lugs 71 and/or the transverse penetrating surface of the collar 10 have inclined planes to facilitate the deformation of the lock 7 during the passage of the collar 10 as it is inserted.

The lock 7 is provided with at least one indexing piece 72, extending longitudinally. In the example shown, each indexing piece 72 extends longitudinally from a lug 71. The head 31 of the connection end fitting 3 comprises notches 35 opening onto the annular groove 33 to accommodate the indexing pieces 72 of the lock 7 when the lock is assembled on the connection end fitting 3. The notches 35 and the indexing pieces 72 make it possible to position the lock in a determined radial position facing the connection end fitting 3 and to block the rotation of the lock 7 arranged in this determined position in the annular groove 33.

Furthermore, the notches 35 have a depth (or radial dimension) greater than the radial extension of the indexing pieces 72 so that the pieces may move radially. By radially separating the indexing pieces 72 in the notches 35, it is thus possible to open the lock 7.

The indexing pieces 72 have a projecting end in the form of a hook, i.e., they have a distal portion 73 projecting toward the inside of the lock 7. In this way, an annular guide space is formed between the distal projecting portion 73 and the lug 71 which it overhangs. Advantageously, the exposed surface of the portions 73 has an inclined plane tending to force the separation of the indexing pieces 72 when a bearing force is applied to them.

FIG. 3 represents the lock 7 assembled with the connection end fitting 3 as well as an unlocking ring 4.

The unlocking ring 4 has an open main part (to be penetrated by the tubular connector 1) and is provided with a collar 41 intended to be inserted into the connection end fitting 3. The collar 41 is provided with unlocking elements 42 arranged as a flange. When the ring 4 is introduced into the end piece 3, the unlocking elements 42 rest on the inclined slopes of the portions 73, which tends to open the lock 7 and thus allow the unlocking elements 42 to be housed in the annular guide space existing between the lugs 71 and the projecting portions 73. In general, the unlocking elements 42 are intended to interact with the lock 7 to force its opening when the ring 4 is rotated and thus allow the tubular connector 1 to be disassembled from the connection end fitting 3.

When the unlocking ring 4 is assembled with the connection end fitting 3, the main part of the ring 4 protrudes from the end piece 3, which makes it easily accessible from the outside so as to be manipulated, for example, to allow its demounting. Just like the head 31 of the end piece 3, the main part of the unlocking ring 4 has a shape configured to be manipulated with a tool that may be very conventional, which here is a hexagonal shape.

The unlocking ring 4 may be made of a plastics material.

Figure 5:
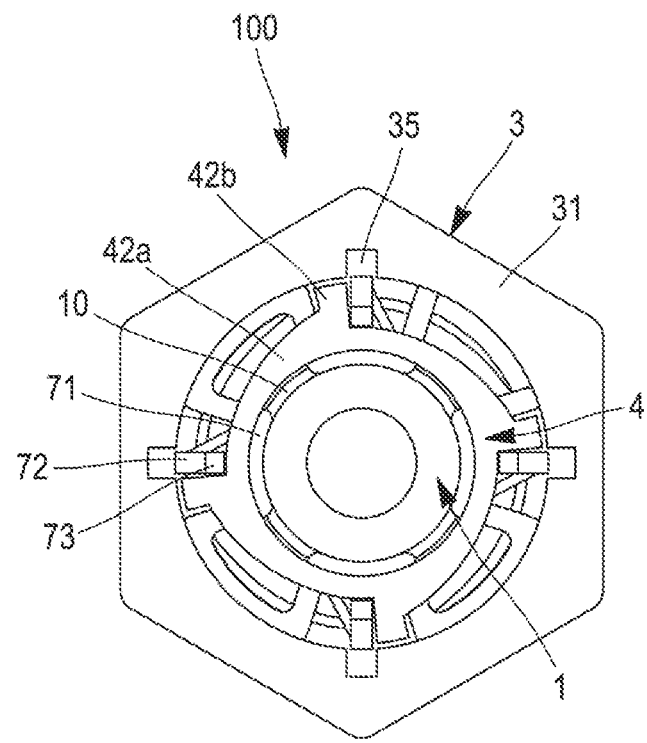
FIG. 5 shows a sectional view, at the level of the collar of the unlocking ring, of a connection device according to the present disclosure in a closed configuration.

FIG. 5 represents a sectional view, at the level of the collar 41 of the unlocking ring 4, of the connection device 100 in a closed configuration. The unlocking elements 42 here comprise a plurality of ramps 42a, which may respectively slide against indexing pieces 72 of the lock 7. When the unlocking ring 4 is rotated in an unlocking direction, the indexing pieces 72 slide on the ramps 42a, which tends to push them radially into the notches 35. In this way, the lock 7 is forced to open by progressively separating the lugs 71 so that they are housed at least partially in the groove. This opens a passage allowing the tubular connector 1 to be removed. When the unlocking ring 4 is released, the ramps 42a tend to return the ring 4 to its initial position and thus close the lock 7 automatically.

The ramps 42a are advantageously shaped as portions of ellipses having as their center the center of the unlocking ring 4. They are also separated from each other by stops 42b, as may be seen in FIG. 5. Each stop 42b is respectively the point of origin and the end point of a ramp 42a. It serves to delimit the angular extension of rotation of the unlocking ring 4, by coming into contact with an indexing piece 72 when the ring is rotated.

Figure 7:
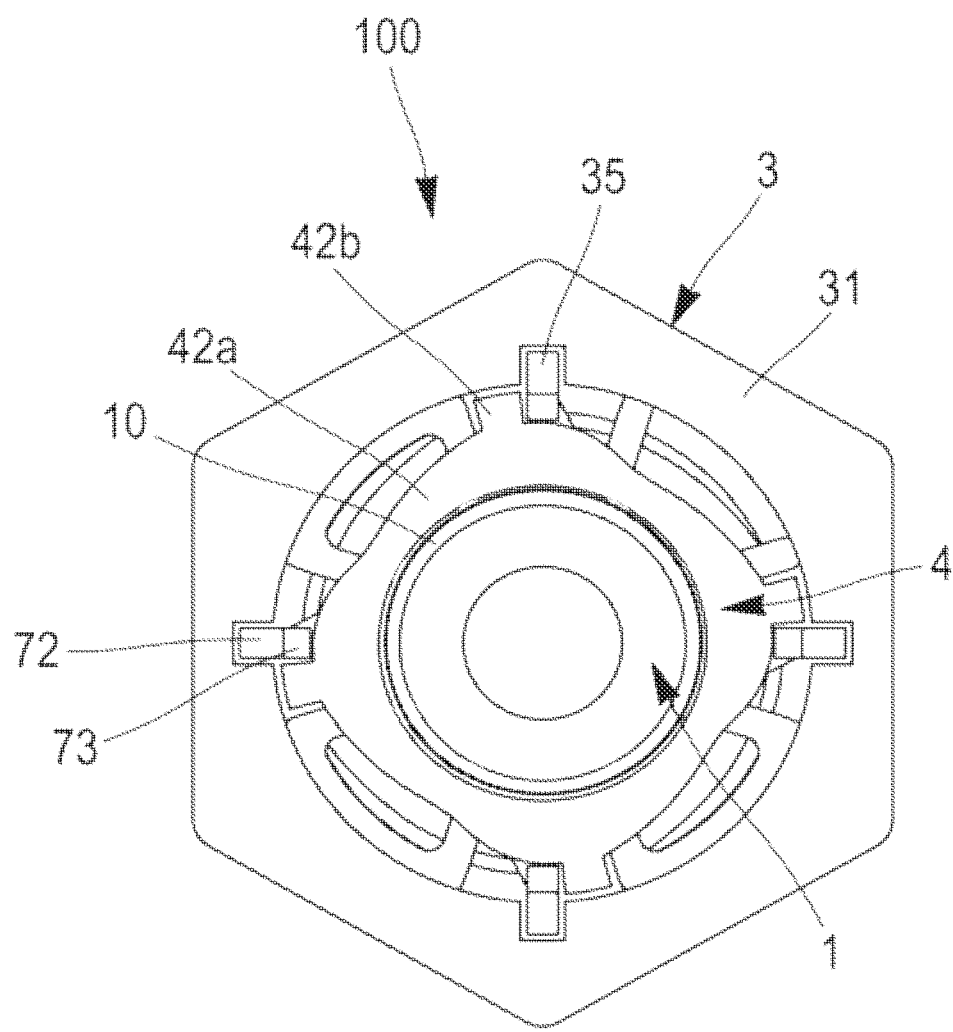
FIG. 7 shows a sectional view, at the level of the collar of the unlocking ring, of a connection device according to another embodiment of the present disclosure in an open configuration.

As an alternative to the ramps 42 with monotonous progression shown in FIGS. 3 and 5, it is possible for each ramp 42a to be formed of several distinct portions (for example, two distinct portions or three distinct portions) to present a flared U-shaped profile, the hollow of the U forming the rest position of the indexing pieces 72. This hollow may be placed in the center of the ramp 42a, for example, halfway through the sliding of each stop 42b. This forms an unlocking ring 4 configured to allow the lock 7 to be opened in both directions of rotation of the ring 4. The lock 7 is then closed when the indexing pieces 72 are placed in the rest position, and open when the indexing pieces 72 are placed against one of the stops 42b, which delimits the ramps 42a (FIG. 7).

Assembly and Operation of the Connection Device

The assembly of the connection device 100 comprises several steps.

A first step comprises the assembly of the lock 7 with the connection end fitting 3. The lock 7 is deformed and/or compressed to reduce its size and allow its introduction into the annular groove 33, by aligning the indexing pieces 72 with the notches 35. Once correctly positioned, the lock 7 returns to its initial, essentially annular shape and may no longer be removed from the connection end fitting 3 (unless it is again forced to deform). At the end of this step, the connection device 100 formed of the end piece 3 and the lock 7 makes it possible to retain the tubular connector 1 in the end piece 3; however, in the absence of the unlocking ring 4, the disconnection of the tubular connector 1 is not possible.

A second step comprises the assembly of the unlocking ring 4 to the connection end fitting 3 provided with the lock 7. The collar 41 of the unlocking ring 4 is inserted into the connection end fitting 3. The sides of the ramps 42a bear against the inclined slopes of the portions 73, which tends to open the lock 7, and thus allows the ramps 42a to be housed in the guide space existing between the lugs 71 and the projecting portions 73.

A third step, which may be carried out before the first step or after the second step, corresponds to the fixing, by screwing, of the connection end fitting 3 to the equipment 2 by means of their respective threads 32 and 21.

The fourth and last step corresponds to the insertion of the tubular connector 1 into the connection device 100 in order to obtain the fluid connection between the duct 6 and the equipment 2. When inserting the connector 1, the collar 10 bears against the lugs 71 to deform them and push the indexing pieces 72 back into the notches 35. Once the penetration of the collar 10 is completed, for example, the connection end fitting 3 is in abutment against the inner shoulder, the lugs 71 return to their initial position and close on the connector 1. In this locked configuration, illustrated in FIGS. 4 and 5, the collar 10 is caught between the inner shoulder of the end piece 3 and the lugs 71. It is not possible to disassemble the connector 1 from the connection end fitting 3.

Unlocking the Connection Device

It is possible to demount the tubular connector 1 by means of the unlocking ring 4. To demount the connection device 100, it suffices to use a tool, for example, an open-end wrench, and apply a rotation of approximately 30° on the unlocking ring 4 to force the spacing of the lugs 71 by progressively bearing on the ramps 42a on the indexing pieces 72.

The rotation of the ring 4 causes the ramps 42a to slide and progressively move the indexing pieces 72 out of the way, allowing them to move freely in the notches 35, which causes the lugs 71 to withdraw from the groove. The lock 7 is fully open when the indexing pieces 72 slide on the ramps 42 and come into contact with the stops 42b, and the connector 1 may be removed from the connection end fitting 3.

When the forces tending to rotate the unlocking ring 4 are no longer applied, the ramps 42a tend to return the ring to its initial position and thus close the lock 7 automatically.

As will be readily understood, the present disclosure is not limited to the described embodiment, and it is possible to add variants thereto without departing from the scope of the invention as defined by the claims.

It is, for example, possible, for safety reasons, to provide two collars 10 successively arranged along the tubular connector 1. In this case, during the fourth step of inserting the tubular connector, the lugs 71 are deformed a first time to allow the first collar to pass, are closed a first time on the connector, and deform again a second time to allow the second collar to pass to close in the locked position.

The invention claimed is:

1. A connection device for connecting a tubular connector defining a longitudinal direction provided with an annular collar to an equipment comprising a passage, the connection device comprising:

a connection end fitting connecting to the passage of the equipment, the connection end fitting being formed of a tubular body and a head mounted thereon provided with an opening leading into the tubular body and comprising a retaining groove, the head comprising at least one notch leading into the retaining groove;

a flexible ring-shaped lock configured to be housed in part in the retaining groove, the lock including at least one lug extending radially toward the center of the lock and at least one longitudinal indexing piece connected to the lug and housed in the notch of the groove, the flexible lock being deformable and the lugs closing on the tubular connector after the passage of the collar when the tubular connector is inserted longitudinally into the connection end fitting; and an unlocking ring provided with a collar configured to be inserted into the connection end fitting, the collar including release elements interacting with the indexing pieces of the flexible lock to force its opening when the unlocking ring is rotated.

2. The connection device of claim 1, wherein the passage is circular and includes an inner thread, and the tubular body includes an outer thread to secure the connection end to the equipment.

3. The connection device of claim 2, wherein the lugs have inclined planes to facilitate the deformation of the lock during the insertion of the tubular connector through the connection end piece.

4. The connection device of claim 3, wherein the flexible lock has a "C" shape and comprises two free ends capable of approaching one another.

5. The connection device of claim 4, wherein the unlocking release elements comprise ramps.

6. The connection device of claim 5, wherein the ramps are separated from each other by a stop.

7. The connection device of claim 5, wherein each ramp has a monotonic progression.

8. The connection device of claim 5, wherein each ramp is formed of a plurality of portions to present a flared "U" profile.

9. The connection device of claim 5, wherein the ramps are shaped as portions of ellipses having as their center the center of the unlocking ring.

10. The connection device of claim 5, wherein the lugs are contained in a transverse plane.

11. The connection device of claim 5, wherein each longitudinal indexing piece has a projecting portion projecting toward the inside of the lock so as to form a guide space between this projecting portion and the lug, the projecting portion overhanging the lug to receive the unlocking elements.

12. The connection device of claim 1, wherein the lugs have inclined planes to facilitate the deformation of the lock during the insertion of the tubular connector through the connection end piece.

13. The connection device of claim 1, wherein the flexible lock has a "C" shape and comprises two free ends capable of approaching one another.

14. The connection device of claim 1, wherein the unlocking release elements comprise ramps.

15. The connection device of claim 14, wherein the ramps are separated from each other by a stop.

16. The connection device of claim 14, wherein each ramp has a monotonic progression.

17. The connection device of claim 14, wherein each ramp is formed of a plurality of portions to present a flared "U" profile.

18. The connection device of claim 14, wherein the ramps are shaped as portions of ellipses having as their center the center of the unlocking ring.

19. The connection device of claim 1, wherein the lugs are contained in a transverse plane.

20. The connection device of claim 1, wherein each longitudinal indexing piece has a projecting portion projecting toward the inside of the lock so as to form a guide space between this projecting portion and the lug, the projecting portion overhanging the lug to receive the unlocking elements.

* * * * *

UNITED STATES PATENT AND TRADEMARK OFFICE
CERTIFICATE OF CORRECTION

| | | |
|---|---|---|
| PATENT NO. | : 12,117,112 B2 | Page 1 of 1 |
| APPLICATION NO. | : 17/627588 | |
| DATED | : October 15, 2024 | |
| INVENTOR(S) | : Kévin Guibert | |

It is certified that error appears in the above-identified patent and that said Letters Patent is hereby corrected as shown below:

In the Claims

Claim 5, Column 7, Lines 21-22, change "wherein the unlocking release elements" to --wherein the release elements--

Claim 14, Column 8, Lines 14-15, change "wherein the unlocking release elements" to --wherein the release elements--

Signed and Sealed this
Twenty-eighth Day of January, 2025

Coke Morgan Stewart
*Acting Director of the United States Patent and Trademark Office*